(12) United States Patent
Winter et al.

(10) Patent No.: US 10,663,015 B2
(45) Date of Patent: May 26, 2020

(54) CLUTCH ACTUATOR WITH AUTOMATIC WEAR COMPENSATION

(71) Applicant: KNORR-BREMSE Systeme fuer Nutzfahrzeuge GmbH, Munich (DE)

(72) Inventors: Simon Winter, Munich (DE); Juergen Schudy, Munich (DE); Alexander Koch, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 179 days.

(21) Appl. No.: 15/812,128

(22) Filed: Nov. 14, 2017

(65) Prior Publication Data
US 2018/0073574 A1 Mar. 15, 2018

Related U.S. Application Data

(63) Continuation of application No. PCT/EP2016/000826, filed on May 18, 2016.

(30) Foreign Application Priority Data

May 19, 2015 (DE) ........................ 10 2015 107 787

(51) Int. Cl.
*F16D 25/08* (2006.01)
*F16D 13/75* (2006.01)
(Continued)

(52) U.S. Cl.
CPC ......... *F16D 25/088* (2013.01); *F16D 13/752* (2013.01); *F16D 25/02* (2013.01);
(Continued)

(58) Field of Classification Search
CPC .... F16D 25/088; F16D 48/066; F16D 29/005; F16D 25/02; F16D 25/061; F16D 13/752;
(Continued)

(56) References Cited

U.S. PATENT DOCUMENTS 3,946,845 A 3/1976 Kamio
4,068,750 A 1/1978 Gatewood
(Continued)

FOREIGN PATENT DOCUMENTS

CN 101103207 A 1/2008
CN 102596669 A 7/2012
(Continued)

OTHER PUBLICATIONS

Japanese-language Office Action issued in counterpart Japanese Application No. 2017-560263 dated Jan. 7, 2019 with English translation (nine (9) pages).

(Continued)

*Primary Examiner* — Jacob S. Scott
*Assistant Examiner* — Lillian T Nguyen
(74) *Attorney, Agent, or Firm* — Crowell & Moring LLP

(57) ABSTRACT

A clutch actuator transmitting a disengaging force to a clutch disengaging device of a includes an actuating element which receives the disengaging force, and a piston rod for transmitting the disengaging force from the actuating element to the disengaging device. The piston rod bears against an actuating element connection region such that the piston rod is movable towards the connection region by the reaction force of the clutch. The positioning of the connection region and the piston rod relative to each other due to the movement can be fixed by applying the disengaging force to the actuating element. The actuating element at least partly deflects the disengaging force, producing a normal force and/or a radial force acting between the connection region and the piston rod. The normal force and/or the radial force fixes the position of the connection region and the piston rod relative to each other.

13 Claims, 2 Drawing Sheets

(51) Int. Cl.
  *F16D 25/02*    (2006.01)
  *F16D 25/061*   (2006.01)
  *F16D 29/00*    (2006.01)
  *F16D 48/06*    (2006.01)
  *F16D 125/06*   (2012.01)

(52) U.S. Cl.
  CPC ......... *F16D 25/061* (2013.01); *F16D 29/005* (2013.01); *F16D 48/066* (2013.01); *F16D 2125/06* (2013.01); *F16D 2500/10406* (2013.01)

(58) Field of Classification Search
  CPC ....... F16D 2125/06; F16D 2500/10406; F16D 25/12
  See application file for complete search history.

(56) References Cited

U.S. PATENT DOCUMENTS

| | | | | |
|---|---|---|---|---|
| 5,390,497 | A * | 2/1995 | Cottam | F16D 25/088 192/85.59 |
| 5,735,188 | A * | 4/1998 | Nix | F16D 25/12 92/129 |
| 2009/0120758 | A1 | 5/2009 | Hedman et al. | |
| 2012/0161420 | A1 | 6/2012 | Eberlein et al. | |
| 2016/0304073 | A1 * | 10/2016 | Hericher | F16D 65/28 |

FOREIGN PATENT DOCUMENTS

| | | |
|---|---|---|
| DE | 37 19 399 A1 | 12/1988 |
| FR | 2 995 374 A1 | 3/2014 |
| GB | 1188893 | 4/1970 |
| JP | 53-79148 A | 7/1978 |
| JP | 56-48924 U | 4/1981 |
| JP | 61-55522 U | 4/1986 |
| WO | WO 2012/119612 A1 | 9/2012 |

OTHER PUBLICATIONS

Chinese-language Office Action issued in counterpart Chinese Application No. 201680029282.5 dated Oct. 23, 2018 with English translation (12 pages).

German Search Report issued in counterpart German Application No. 10 2015 107 787.6 dated Mar. 19, 2015 with partial English-language translation (Ten (10) pages).

International Search Report (PCT/ISA/210) issued in PCT Application No. PCT/EP2016/000826 dated Jul. 25, 2016 with English-language translation (Five (5) pages).

German-language Written Opinion (PCT/ISA/237) issued in PCT Application No. PCT/EP2016/000826 dated Jul. 25, 2016 (Five (5) pages).

* cited by examiner

CLUTCH ACTUATOR WITH AUTOMATIC WEAR COMPENSATION

CROSS REFERENCE TO RELATED APPLICATIONS

This application is a continuation of PCT International Application No. PCT/EP2016/000826, filed May 18, 2016, which claims priority under 35 U.S.C. § 119 from German Patent Application No. 10 2015 107 787.6, filed May 19, 2015, the entire disclosures of which are herein expressly incorporated by reference.

BACKGROUND AND SUMMARY OF THE INVENTION

The invention relates to a clutch actuator with automatic wear compensation for the preferential actuation of a starting clutch for vehicles that is closed in the unactuated state.

A clutch for a vehicle serves to completely separate the non-positive connection between the motor and the transmission during shifting operations of the transmission and gradually build up the same when starting. Said clutch contains a clutch disk assigned to the motor and a clutch disk assigned to the transmission. Both clutch disks are provided with friction linings and, in the closed state of the clutch, are pressed against one another by a clutch reaction force, which is generally provided by a spring.

A clutch actuator transmits a disengaging force that is opposed to the clutch reaction force to the clutch. As a result, the clutch disks can be separated from one another so that the non-positive connection between motor and transmission is interrupted. However, for starting, the clutch can also be transferred to a state of slipping, in which the clutch disks rub against one another and only a freely selectable part of the torque provided by the motor is transmitted to the transmission. Through the rubbing, the friction linings wear and become thinner over time so that the kinematic deflection condition between the clutch actuator and the clutch changes. For this reason, the clutch actuator has to be continuously readjusted by way of a length compensation so that upon actuation of the clutch it transmits the disengaging force to the clutch without play. Here said adjustment must be mechanically stable enough that it is not changed by the action of the disengaging force.

WO 2012 119 612 A1 discloses a clutch actuator, in which an actuator piston is subjected to the disengaging force by an auxiliary energy source and transmits this disengaging force to the clutch via a piston rod. For the length compensation, the piston rod, which has an external transmission thread, is coupled to the actuator piston via an intermediate piece with an internal transmission thread corresponding thereto. The total length of piston length and intermediate piece is automatically readjusted by virtue of the fact that, in the closed state of the clutch, the non-rotatingly mounted piston rod is screwed, by the clutch reaction force, into the intermediate piece, wherein the intermediate piece is inevitably rotated. The actuator piston has a blocking region, which, on actuating the clutch, enters into a frictional connection with a region on the intermediate piece corresponding thereto and blocks the rotary movement of the intermediate piece. By way of the intermeshing transmission threads and the anti-rotation feature of the piston rod, a relative movement between piston rod and intermediate piece is thus blocked.

The object of the present invention is to further develop the clutch actuator according to the prior art so that it can be produced in a simpler manner and with fewer components.

This and other objects are solved by a clutch actuator according to embodiments of the invention.

Within the scope of the invention, a clutch actuator for transmitting a disengaging force $F_A$ to a disengaging device of a clutch has been developed. This clutch actuator comprises an actuating element that can be subjected to the disengaging force $F_A$ and a piston rod for transmitting the disengaging force $F_A$ from the actuating element to the disengaging device. Here, the piston rod is mounted against a connecting region of the actuating element so that the piston rod can be moved against the connecting region through the clutch reaction force $F_K$ of the clutch. The positioning of connecting region and piston rod relative to one another brought about by such a movement can be fixed by subjecting the actuating element to the disengaging force $F_A$.

According to the invention, the actuating element is designed for the at least partial deflection of the disengaging force $F_A$ into a normal force $F_N$ and/or radial force $F_R$ that is active between the connecting region and the piston rod. This normal force $F_N$ and/or radial force $F_R$ fixes the positioning of connecting region (14, 24) and piston rod (15, 25) relative to one another.

It has been recognized that the intermediate piece provided according to the prior art can be saved in this manner. Furthermore, a separate blocking region on the actuating element is no longer required. Instead, the additional normal force $F_N$ and/or radial force $F_R$ is introduced, for the purpose of fixing the positioning, exactly at the point at which the piston rod and the connecting region are in contact for the purpose of guiding the mutual movement anyway.

This type of fixing has the advantage, furthermore, that it is immediately effective when the actuating element is subjected to the disengaging force. The blocking according to the prior art was activated by virtue of the fact that the actuator piston was moved into a position in which its blocking region entered into the frictional connection with the region on the intermediate piece corresponding thereto. At least for a brief moment, the blocking was thus not initially effective with every actuation of the clutch, while the actuator piston covered the idle travel up to the establishment of the frictional connection on the blocking region. In the event of a sudden powerful actuation, the piston rod and the intermediate piece could thus be unintentionally moved against one another and the automatic adjustment in this regard could be worsened. The disengaging force $F_A$ necessary for opening the clutch is very large and can typically be above 6,000 N.

Furthermore, in contrast with the prior art, threads on the piston rod and on the connecting region can also be omitted. In a particularly advantageous configuration of the invention, an outer circumference of the piston rod is slideable against an inner circumference of the connecting region. The outer circumference of the piston rod and the inner circumference of the connecting region need not be specially processed; there can be, in each case, smooth surfaces that slide against one another or slide past one another without touching, for example. The clutch rod and the connecting region are thus easier to produce and less susceptible to wear.

However, the fixing according to the invention can also be utilized in the configuration in which the piston rod has an external transmission thread, which engages in an internal transmission thread on the connecting region. The mutually engaging transmission threads partly convert the linear movement of the piston rod driven by the clutch reaction force $F_K$ to a rotary movement of the piston rod relative to the connecting element. Here, by way of the pitch of the thread, an additional degree of freedom is available. In this configuration, the fixing according to the invention has the advantage that the piston rod need no longer be mounted in a non-rotational manner.

Advantageously, means for exerting a preload force $F_F$, that is effective between the piston rod and the actuating element, said preload force counteracting the clutch reaction force $F_K$ of the clutch, are provided. These means can comprise, for example, a preloading spring. The preload force $F_F$ is of subordinate importance regarding the length compensation; it can be used to set the contact pressure of the two clutch disks against one another that is considered to be the unactuated state of the clutch for the purpose of the length compensation. The main purpose of the preload force $F_F$, even in the unactuated state of the clutch actuator, is to exert a certain minimum force on the disengaging device and to ensure that no play develops between the piston rod and the disengaging device.

In a particularly advantageous configuration of the invention, the normal force $F_N$ or the radial force $F_R$ fixes the positioning of connecting region and piston rod relative to one another via a self-amplifying frictional connection. Self-amplification in this connection is to be understood to mean that the magnitude of the normal force $F_N$ or of the radial force $F_R$ automatically tracks the magnitude of the disengaging force $F_A$. The piston rod and the connecting region are then only subjected to the respectively needed magnitude of normal force $F_N$ or radial force $F_R$, which protects the components.

In a particularly advantageous configuration of the invention, the connecting region is mounted on the actuating element so that said connecting region can be radially pivoted in the direction of the piston rod through a linear movement of the actuating element in the axial direction of the piston rod. The normal force $F_N$ or radial force $F_R$ is then proportional to the disengaging force $F_A$ exerted on the actuating element. The proportionality constant is determined by the geometry of the mounting.

Advantageously, the connecting region is designed as a connecting element and/or is part of a connecting element, wherein this connecting element can be fixed against a stop on the actuating element through the clutch reaction force $F_K$ and/or through the preload force $F_F$. A separate production of actuating element and connecting element can be simpler than a one-piece production of an actuating element with integrated connecting element. Assembly is also simple. Here, the same effect is ultimately achieved as if actuating element and connecting element were a one-piece unit. This applies, in particular, when the connecting element is fixed by the typically large clutch reaction force $F_K$.

In a further advantageous configuration of the invention, the connecting region is designed as a connecting element, which is pivotably mounted against the actuating element. Here, the connecting element and the actuating element can consist, in particular, of the same material and the connecting element, together with the actuating element, can be realized as a single component. For example, a combination of an actuating element with a connecting element mounted against the same via a fixed-body joint, can be produced in one piece. However, the connecting element can also be a separate component, which is mounted against the actuating element via a hinge or a similar connection. Such connections are more expensive to produce but are more durable than fixed-body joints in which the material is subjected to bending with every positional change.

In a particularly advantageous configuration of the invention, an end stop position is provided, with which the actuating element is in contact when the clutch is engaged. This end stop position is then, on the one hand, a fixed reference point for the length compensation, which takes place through the relative movement between the connecting region and the piston rod. On the other hand, in a further particularly advantageous configuration of the invention, means for reducing and/or eliminating the normal force $F_N$ and/or the radial force $F_R$ can be provided, said means being actuable by bringing the actuating element into the end stop position. The length compensation through the relative movement between the piston rod and the connecting region, which, in the unactuated state of the clutch, is driven by the clutch reaction force, is then obstructed as little as possible by way of friction between the connecting region and the piston rod. An example for such a means for reducing and/or eliminating the normal force $F_N$ and/or the radial force $F_R$ is a connecting element that is pivotably mounted on the actuating element, said connecting element forming a contact point of the actuating element to the end stop position when the clutch is engaged.

In a further particularly advantageous configuration of the invention, the actuating element is designed as a piston, which is displaceably mounted in a housing and, in this housing, closes off a pressure chamber. The actuating element can then be subjected to the disengaging force by introducing a pressure medium into the pressure chamber. Especially in the case of utility vehicle clutches, major forces sometimes have to be exerted with the result that the actuation with the foot-exerted force of the driver alone is strenuous over time. However, this foot-exerted force can be amplified many times with simple means by way of pneumatics or hydraulics and subsequently introduced into the pressure chamber by the pressure medium. Furthermore, an electronically controlled clutch (clutch by wire), for example in automated shift transmissions, can also direct the disengaging force to the actuating element by introducing a pressure medium into the pressure chamber.

The invention, and in particular the length compensation, however, functions entirely analogously when another source of force is utilized for subjecting the actuating element to the disengaging force. For example, the actuating element of an electronically controlled clutch (clutch by wire) can also be electromechanically moveable, for example by a motor.

The necessity of a length compensation is more pronounced in utility vehicles than in passenger cars. Since the clutch reaction force $F_K$ in the case of a utility vehicle clutch is substantially greater than in the case of a clutch for passenger cars, a plurality of mechanical transmissions are typically arranged in the chain of action between the piston rod and the clutch disks, said mechanical transmissions reducing the necessary disengaging force $F_A$ and in turn extend the necessary actuation travel. Thus, a lining wear of the order of magnitude of 5 to 8 mm translates into a necessary length compensation of the order of magnitude of 60 to 65 mm. This length compensation can thus be significantly greater than the actuation travel of the actuating element necessary for the transition from a fully closed to a fully opened clutch, which actuation travel can be of the order of magnitude of 20 to 30 mm, for example.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
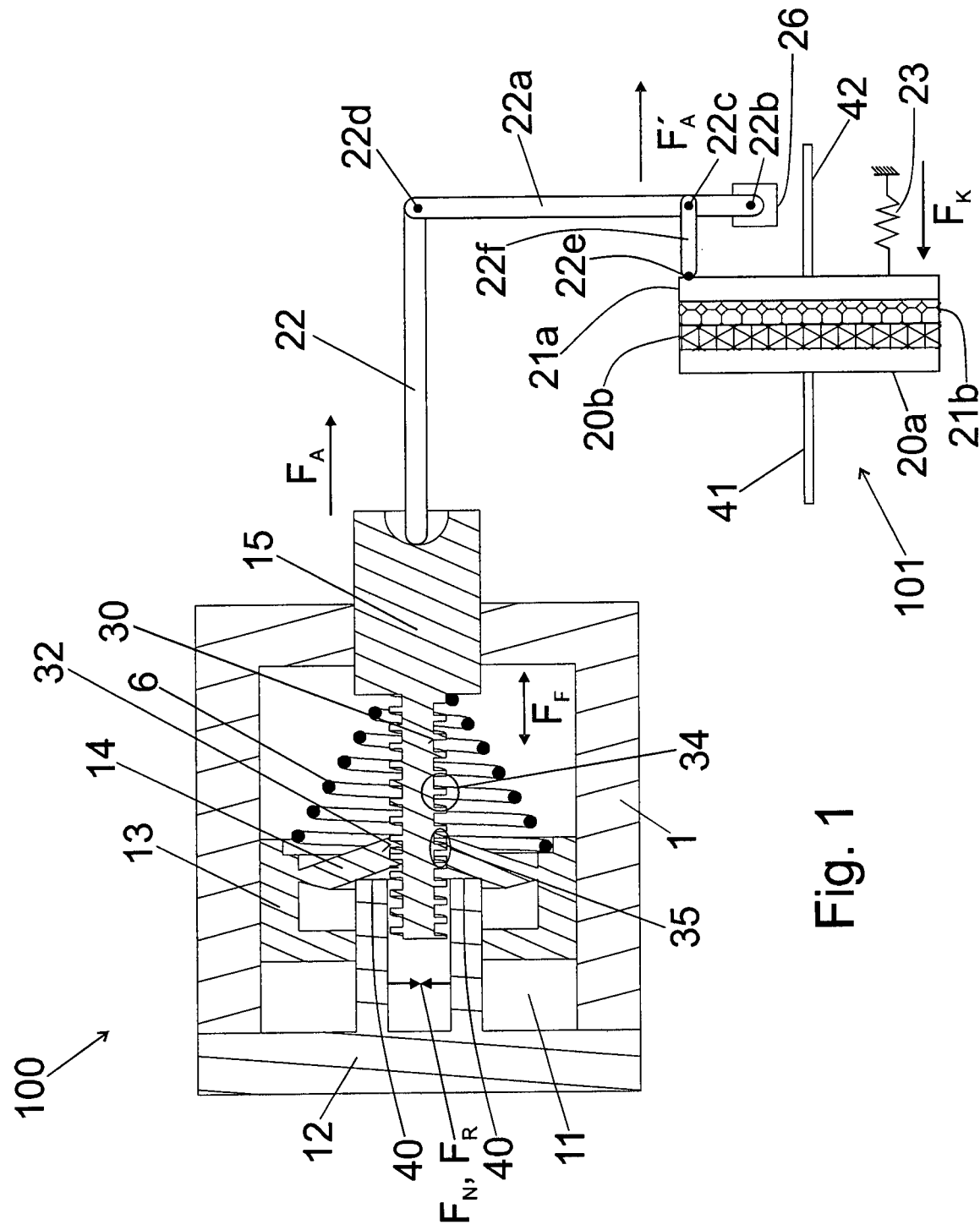
FIG. 1 is a schematic diagram of an exemplary embodiment of the clutch actuator according to the invention with mutually engaging transmission threads on the piston rod and connecting region.

FIG. 1 shows a first exemplary embodiment of the clutch actuator 100 according to the invention. An essential feature here is that a functional integration of the two partial functions "length compensation" and "blocking of length compensation" into the components connecting element 14 and piston rod 15 takes place, specifically exactly at the point at which these two components are in contact with one another anyway for the purpose of the mutual relative movement.

The mode of operation in this case presents itself as follows. The actuating element 13 designed as a piston is radially mounted in a housing 1 and sealed in the direction of a resulting pressure chamber. The housing 1 with its cover 12 and the piston 13 enclose a pressure chamber 11. By means of auxiliary energy, which is supplied to the pressure chamber 11 in the form of a pressure medium, the disengaging force $F_A$ is exerted on the piston 13. In contrast with the prior art, this force positively supports itself on the connecting element 14 designed as a clamping element. On its inner circumference 32, the clamping element 14 has an internal transmission thread 35, with which it is in positive contact with a corresponding external transmission thread 34 on the outer circumference 30 of the piston rod 15. Furthermore, there is a frictional contact between clamping element 14 and piston rod 15 in the radial direction. This frictional connection can, but does not necessarily have to, be present even in the unactuated state of the clutch actuator 100.

Upon actuation of the clutch actuator 100, a radial force $F_R$ that is proportional to the actuator force is created on the clamping element 14, which ensures a correspondingly self-amplifying frictional connection between clamping element 14 and piston rod 15 and prevents a length compensation between piston 13 and piston rod 15 during the actuation of the clutch actuator 100. The piston rod 15 furthermore transmits the actuator force or the corresponding travel of the piston 13 to the clutch 101 via a disengagement lever 22.

In the unactuated state of the clutch actuator 100, the clutch reaction force $F_K$ is directed to the piston rod 15 via the disengagement lever 22. The preload spring 6 engaging there slides the piston 13 in the direction of the lid 12 until the clamping element 14 lies against the end stop position 40 arranged on the lid 12 in such a manner that the radial force $F_R$ and thus the frictional connection in the radial direction between clamping element 14 and piston rod 15 is canceled. To this end, the components are designed in such a manner that the force exerted from the end stop position on the clamping element 14 leads to a radial opening or unloading of the corresponding functional surface on the clamping element 14.

The clutch 101 comprises a clutch disk 20a assigned to the motor with a frictional lining 20b and a clutch disk 21a assigned to the transmission with a frictional lining 21b. The two clutch disks 20a and 21a are pressed against one another by the resetting spring 23, which exerts the clutch reaction force $F_K$. They can be separated from one another or transferred to a state of slipping relative to one another by moving the disengagement lever 22 against the force of the resetting spring 23.

A kinematic change originating from the clutch 101 through lining wear, which requires a length compensation between piston 13 and piston rod 15, can thus take place via the transmission thread of the components clamping element 14 and piston rod 15. During the actuation phases, by contrast, a blocking of the readjusting mechanism is ensured through the frictional connection between clamping element 14 and piston rod 15 by virtue of the fact that a length compensation between piston 13 and piston rod 15 via the transmission thread in the components clamping element 14 and piston rod 15 is prevented.

The shaft 41 assigned to the motor and the shaft 42 assigned to the transmission, between which the clutch 101 establishes a non-positive connection in the closed state, are offset against the longitudinal axis of the disengagement lever 22 and the piston rod 15. To this end, the disengagement lever 22 does not actuate the clutch 101 directly but by means of a lever linkage, which comprises the elements 22a and 22f. The disengagement lever 22 is pivotably mounted against the element 22a via a joint 22d. At its other end, the element 22a is pivotably mounted against a fixed point 26 with a joint 22b. The element 22f is pivotably mounted on the element 22a with a further joint 22c. The element 22f is articulated on the clutch disk 21a at the point 22e. The lever linkage offsets not only the axis in which the disengaging force $F_A$ acts, but amplifies this force $F_A$ through the lever action to form a force $F'_A$. The distance, by which the piston rod 15 has to be moved for actuating the clutch is enlarged with the same lever ratio.

Figure 2:
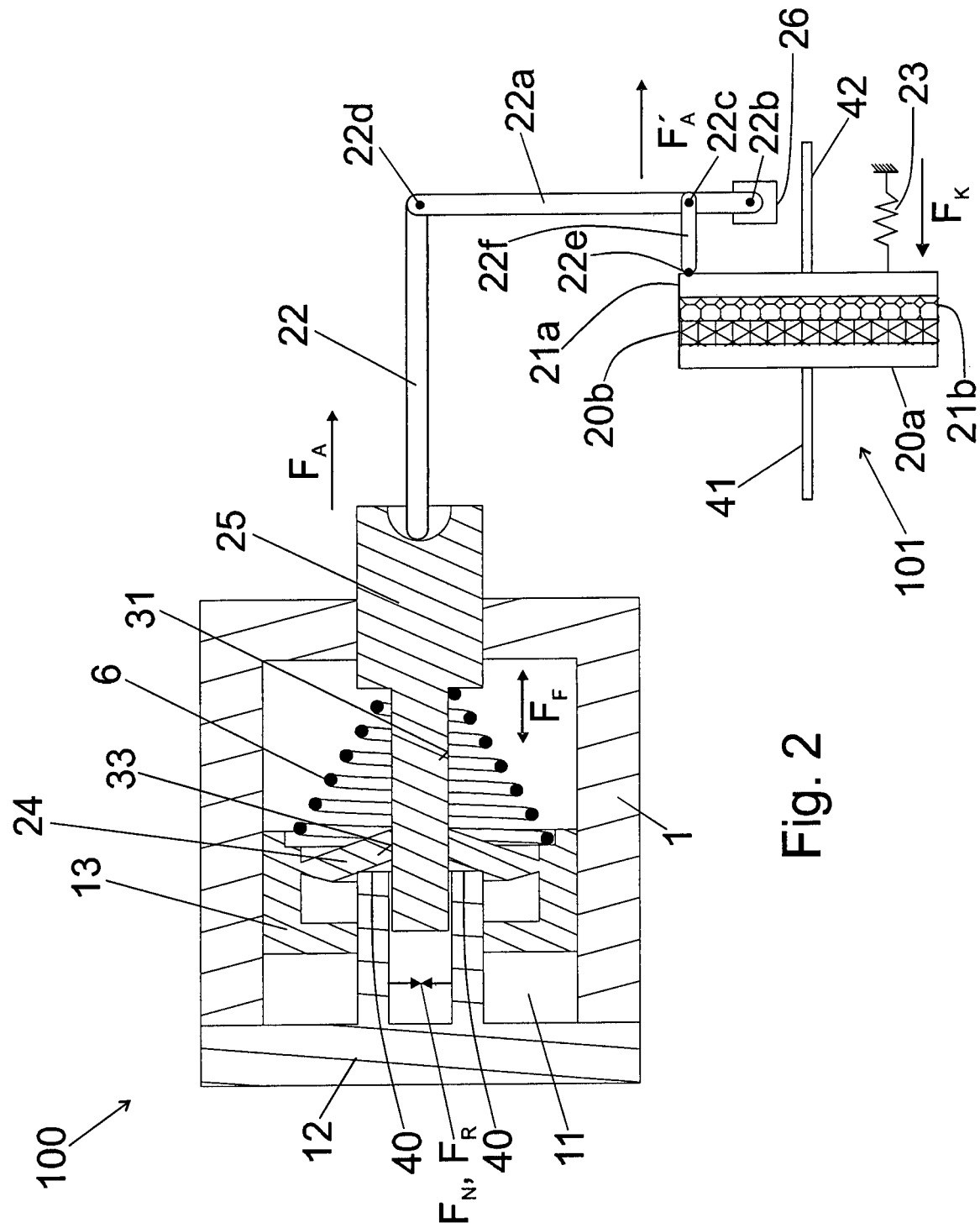
FIG. 2 is a schematic diagram of an exemplary embodiment of the clutch actuator according to the invention without threads on the piston rod and connecting region.

FIG. 2 shows a further exemplary embodiment of the clutch actuator 100 according to the invention. An essential feature besides a functional integration of the two partial functions "length compensation" and 'blocking of length compensation" in the components clamping element 24 and piston rod 25, as already shown in FIG. 1 for the clamping element 14, in this case is that transmission threads 34, 35 for the length compensation become obsolete. As a result, the complexity of the clutch actuator 100 is further reduced. The mode of operation in this case presents itself as follows. The actuating element 13 designed as a piston is radially mounted in a housing 1 and sealed in the direction of a resulting pressure chamber 11. The pressure chamber 11 is enclosed by the components housing 1, lid 12 of the housing 1 and piston 13. The disengaging force $F_A$ is exerted on the piston 13 by means of auxiliary energy, which is fed to the pressure chamber 11 in the form of a pressure medium. Analogously to the exemplary embodiment shown in FIG. 1, this force positively supports itself on the clamping element 24. A frictional contact exists in the radial direction between clamping element 24 and piston rod 25. This frictional connection can, but does not not necessarily have to, be present even in the unactuated state of the clutch actuator 100.

On actuating the clutch actuator 100, a radial force $F_R$ that is proportional to the actuator force develops on the clamping element 24, which ensures a corresponding self-amplifying frictional connection between clamping element 24 and piston rod 25 and prevents a length compensation between piston 13 and piston rod 25 during the actuation of the clutch actuator 100. The piston rod 25 furthermore, transmits the actuator force or the corresponding travel of the piston 13 to the clutch 101 via a disengagement lever 22.

In the unactuated state of the clutch actuator 100, the clutch reaction force $F_K$ is directed to the piston rod 25 via the disengagement lever 22. The preload spring 6 engaging there slides the piston 13 in the direction of the lid 12 until the clamping element 24 lies against the end stop position arranged on the lid 12 in such a manner that the radial force $F_R$ and thus the frictional connection in the radial direction between clamping element 24 and piston rod 25 is canceled. To this end, the components are designed in such a manner that the force exerted on the clamping element 24 from the end stop position leads to a radial opening or unloading of the corresponding functional surface on the clamping element 24. The smooth outer circumference 31 of the piston rod 25 can then freely slide against the smooth outer circumference 33 of the connecting element 24 corresponding thereto for the length compensation.

The clutch 101 is the same as shown in the exemplary embodiment in FIG. 1. It is also actuated in the same manner by the disengagement lever 22 via the lever linkage consisting of the elements 22a and 22f so that the axes of the shaft 41 assigned to the motor and the shaft 42 assigned to the transmission in turn are offset against the longitudinal axis of the disengagement lever 22 and of the piston rod 25. A kinematic change originating from the clutch by way of lining wear, which requires a length compensation between piston (13) and piston rod (25), can take place between the components clamping element 24 and piston rod 25, which slide against one another with their respective functional surfaces. During the actuation phases, by contrast, a blocking of the readjusting mechanism is ensured through the frictional connection between clamping element 24 and piston rod 25 by virtue of the fact that a length compensation between piston 13 and piston rod 25 is prevented through the frictional connection between the components clamping element 24 and piston rod 25. Compared with the exemplary embodiment shown in FIG. 1, a higher radial force $F_R$ is needed since a rotation of two components provided with transmission threads against one another can be more easily blocked than a sliding of two components against one another. With the same disengaging force $F_A$, the higher radial force $F_R$ can be provided by a design of the clamping element 24 that is adapted relative to the clamping element 14.

LIST OF REFERENCE NUMERALS

1 Housing
11 Pressure chamber in the housing 1
12 Lid of the housing 1
13 Actuating element, piston
14, 24 Connecting elements, clamping elements
15, 25 Piston rods
6 Preload spring
20a, 21a Clutch disks of the clutch 101
20b, 21b Friction linings of the clutch disks 20a, 21a
22 Disengagement lever of the clutch 101
22a, 22f Elements of the lever linkage for the clutch actuation
22b, 22c, 22d Joints
22e Articulation point on the clutch disk 21a
23 Resetting spring of the clutch 101 for clutch reaction force $F_K$
26 Fixed bearing point for element 22a
30 Outer circumference of the piston rod 15
31 Outer circumference of the piston rod 25
32 Inner circumference of the connecting region 14
33 Inner circumference of the connecting region 15
34 External transmission thread of the piston rod 15
35 Internal transmission thread of the connecting element 14
40 End stop position for the actuating element 13
41 Shaft assigned to the motor
42 Shaft assigned to the transmission
100 Clutch actuator
101 Clutch
$F_A$ Disengaging force
$F'_A$ Disengaging force $F_A$ amplified by lever action
$F_F$ Preload force
$F_K$ Clutch reaction force
$F_N$ Normal force
$F_R$ Radial force The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A clutch actuator for transmitting a disengaging force to a disengaging device of a clutch, comprising:
    an actuating element that is subjected to the disengaging force; and
    a piston rod for transmitting the disengaging force from the actuating element to the disengaging device,
    wherein
        the piston rod is mounted against a connecting region of the actuating element so that the piston rod is movable against the connecting region by a clutch reaction force of the clutch,
        the positioning of the connecting region and the piston rod relative to one another is fixed during application of the disengaging force,
        the actuating element is configured for the at least partial deflection of the disengaging force into a normal force and/or radial force that is effective between the connecting region and the piston rod, wherein said normal force and/or radial force fixes the positioning of the connecting region and the piston rod relative to one another.

2. The clutch actuator as claimed in claim 1,
    an outer circumference of the piston rod is slideable against an inner circumference of the connecting region.

3. The clutch actuator as claimed in claim 2, wherein the piston rod has an external transmission thread, which engages in an internal transmission thread on the connecting region.

4. The clutch actuator as claimed in claim 1, wherein the piston rod has an external transmission thread, which engages in an internal transmission thread on the connecting region.

5. The clutch actuator as claimed in claim 1, further comprising:
    a preload force device for exerting a preload force that is effective between the piston rod and the actuating element, said preload force counteracting the clutch reaction force of the clutch, is provided.

6. The clutch actuator as claimed in claim 1, wherein the normal force or the radial force fixes the positioning of connecting region and piston rod relative to one another via a self-amplifying frictional connection.

7. The clutch actuator as claimed in claim 1, wherein the connecting region is mounted on the actuating element so that said connecting region can be radially pivoted in the direction of the piston rod through a linear movement of the actuating element in the axial direction of the piston rod.

8. The clutch actuator as claimed in claim 1, wherein the connecting region is designed as a connecting element and/or is part of a connecting element, wherein said connecting element is fixable against a stop on the actuating element through the clutch reaction force and/or through the preload force.

9. The clutch actuator as claimed in claim 1, wherein the connecting region is configured as a connecting element, which is pivotably mounted on the actuating element.

10. The clutch actuator as claimed in claim 1, wherein an end stop position is provided, with which the actuating element is in contact when the clutch is engaged.

11. The clutch actuator as claimed in claim 10, further comprising:
means for reducing and/or eliminating the normal force and/or the radial force are provided, said means being actuatable by bringing the actuating element into the end stop position.

12. The clutch actuator as claimed in claim 11, wherein the means for reducing and/or eliminating the normal force and/or the radial force is a connecting element, which is pivotably mounted on the actuating element.

13. The clutch actuator as claimed in claim 1, wherein the actuating element is a piston, which is displaceably mounted in a housing and, in said housing, closes off a pressure chamber, so that the actuating element is subjected to the disengaging force by introducing a pressure medium into the pressure chamber.

\* \* \* \* \*